US007260897B1

(12) United States Patent
Neff

(10) Patent No.: US 7,260,897 B1
(45) Date of Patent: Aug. 28, 2007

(54) LOCK MITER GAUGE

(76) Inventor: Leslie A. Neff, 25380 South 610 Dr., Grove, OK (US) 74344

( * ) Notice: Subject to any disclaimer, the term of this patent is extended or adjusted under 35 U.S.C. 154(b) by 0 days.

(21) Appl. No.: 11/390,384

(22) Filed: Mar. 28, 2006

(51) Int. Cl.
*B23Q 17/22* (2006.01)

(52) U.S. Cl. ............................ 33/638; 33/645; 33/833

(58) Field of Classification Search .................. 33/613, 33/628, 636, 637, 638, 639, 642, 645, 832, 33/833; 83/522.11, 522.15, 522.17, 522.25
See application file for complete search history.

(56) References Cited

U.S. PATENT DOCUMENTS

| | | | | |
|---|---|---|---|---|
| 753,221 | A | 3/1904 | Basola | |
| 1,133,587 | A | 3/1915 | Stenersen | |
| 2,417,234 | A * | 3/1947 | Frederick | 33/638 |
| 2,645,021 | A | 7/1953 | Dierkes | |
| 2,770,884 | A | 11/1956 | Eckert et al | |
| 3,507,047 | A * | 4/1970 | Städele | 33/639 |
| 4,608,761 | A * | 9/1986 | Small | 83/522.25 |
| 4,930,221 | A | 6/1990 | Taylor | |
| 5,168,637 | A | 12/1992 | Gibson | |
| 5,337,489 | A * | 8/1994 | Mustafa | 33/832 |
| 5,456,017 | A * | 10/1995 | Meier | 33/832 |
| 5,875,827 | A | 3/1999 | Brutscher et al. | |
| 7,000,331 | B2 * | 2/2006 | Kennedy | 33/833 |
| 7,171,760 | B1 * | 2/2007 | Lemon | 33/833 |
| 2003/0014876 | A1 | 1/2003 | Goldie | |
| 2004/0187335 | A1 * | 9/2004 | Locaputo | 33/642 |

* cited by examiner

*Primary Examiner*—G. Bradley Bennett
(74) *Attorney, Agent, or Firm*—Stephen R. Greiner

(57) ABSTRACT

A gauge for use by woodworkers in setting the height of a router bit to make lock miter joints with a router table. The gauge includes a base for upright positioning upon a router table. The base has a bottom plate and a top plate connected by a crosspiece. A gauging arm is pivotally connected to the crosspiece at a pivot point and having a front portion extending forwardly from the pivot point and a rear portion extending rearwardly from the pivot point. A gauging finger extends laterally from the front portion of the gauging arm. A setscrew extends upwardly from the rear portion of the gauging arm to a location below the top plate.

3 Claims, 2 Drawing Sheets

LOCK MITER GAUGE

FIELD OF THE INVENTION

The present invention relates generally to geometrical instruments and, more particularly, to proportional dividers.

BACKGROUND OF THE INVENTION

The 45° lock miter joint is considered by many woodworkers to be one of the most beautiful, yet difficult, to make. Proper tools, like a router table with: a large work surface, a stiff fence, and a powerful motor spinning a sharp lock miter bit, are a necessity. Furthermore, boards being worked must be flat and well prepared to prevent exit tear-out and chipping. Finally, a high degree of skill in adjusting the height and depth of cut of the lock miter bit is needed since a lock miter cut must be made in a single pass.

A careful examination of the two boards joined together by a well-made 45° lock miter joint indicates that the bit that produced the cuts in the boards must have been perfectly centered between the top and bottom surfaces of each of the boards. Of course, the center of a 45° lock miter bit is located at the midpoint of the bottom edge of the bit's protruding notch cutting blade. Obtaining correspondence between the centers of the boards and the lock miter bit is not easy.

Normal set-up of a router table to align the center of a board with the center of a 45° lock miter bit is painstaking and time-consuming. First, the thicknesses of the boards are measured. Then, the lock miter bit is moved up and down and the fence is moved back and forth so that the center of the bit is positioned at a distance, equivalent to one-half of the thickness of the boards, away from the top of the router table. Also, the fence is set the same distance from the outer edge of the notch-cutting blade of the bit. Unfortunately, any movement of the bit to adjust cutting height has an effect on both cutting depth and height and the same is true with movements of the fence. Thus, the adjustment process becomes one of hit or miss, dependent upon the accuracy of the measuring devices at hand.

Woodworkers that are tenacious and brave enough to produce woodwork containing lock miter joints are rewarded with items that are striking in appearance and strong. Lock miter joints, as is well known, are virtually invisible and cannot be seen from the outside of an object constructed with them. Further, such joints are sturdy since they have a large surface for gluing.

SUMMARY OF TH INVENTION

In light of the problems associated with the known methods and apparatus for forming 45° lock miter joints, it is a principal object of the present invention to provide a gauge that divides the thickness of a board in two and permits the transfer of that divided thickness to a router table for the precise positioning of a 45° lock miter bit used therewith. Thus, a user of the gauge can make bevel cuts in boards for the formation of 45° lock miter joints quickly, easily, and with great precision—something impossible in the past.

It is another object of the invention to provide a lock miter gauge of the type described that requires neither prolonged training nor time-consuming set-up work to use safely and effectively. No additional tools are required to use the gauge.

It is a further object of the invention to provide a lock miter gauge of the type described that permits the positioning of a 45° lock miter bit relative to both the top of a router table and a fence associated with a router table to be accurately set.

It is an object of the invention to provide improved features and arrangements thereof in a lock miter gauge for the purposes described that is lightweight in construction, compact in size, inexpensive to manufacture, and fully dependable in use.

Briefly, the lock-miter gauge in accordance with this invention achieves the intended objects by featuring a base for positioning upon the top of a router table or against one side of the fence used with the router table. The base has a bottom plate and a top plate connected together by a crosspiece in a C-shaped configuration. A gauging arm is pivotally connected to the crosspiece by a pivot pin that defines a pivot point. The gauging arm has a front portion extending forwardly from the pivot point and a rear portion extending rearwardly from the pivot point. The front portion is about half as long as the rear portion. A gauging finger extends laterally from the front portion of the gauging arm. A setscrew extends upwardly from the rear portion of the gauging arm to a location below the top plate. A thumbscrew passes through a slot in the crosspiece and into a threaded bore in the gauging arm for setting the position of the gauging arm relative to the base.

The foregoing and other objects, features, and advantages of the lock miter gauge will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
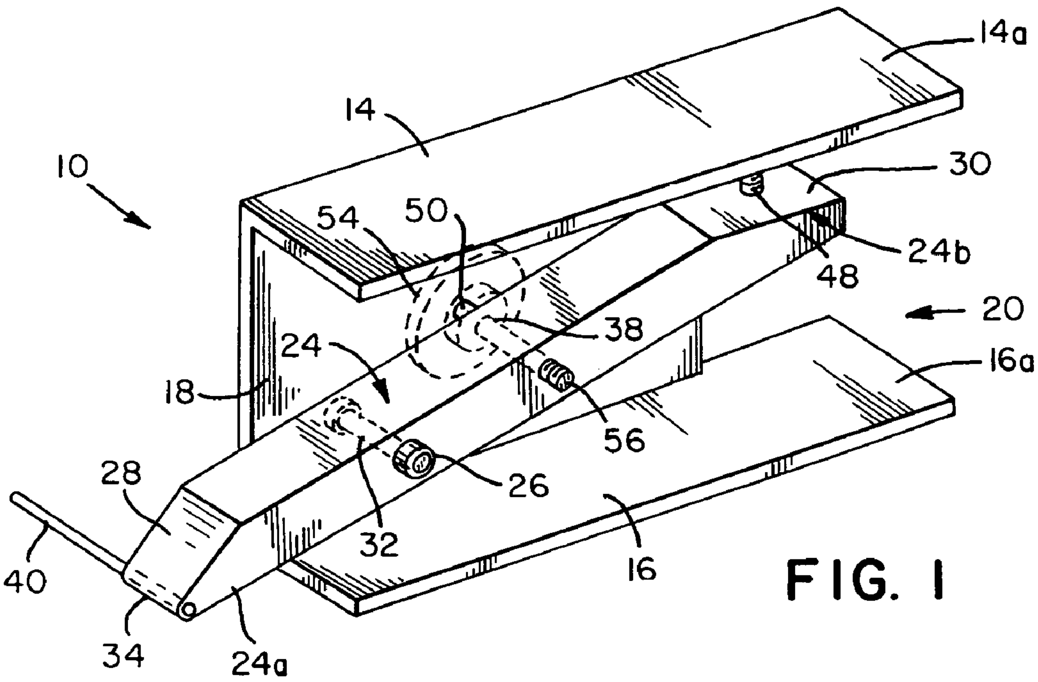
FIG. 1 is a perspective view of a lock miter gauge in accordance with the present invention.
Figure 2:
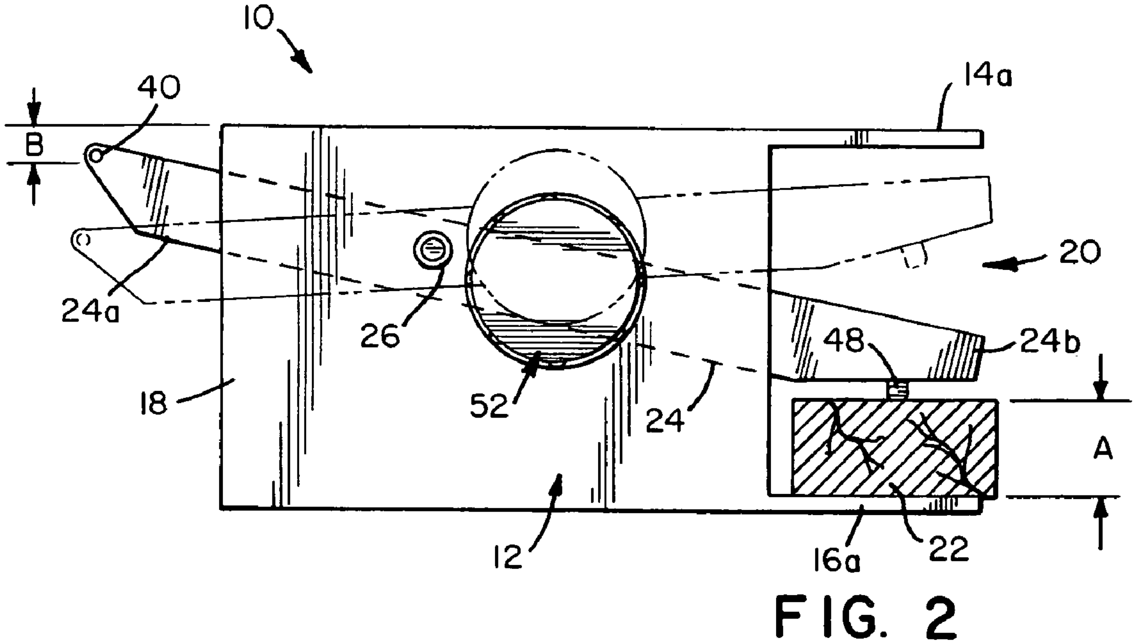
FIG. 2 is a right side view of the lock miter gauge shown measuring the thickness of a board.
Figure 3:
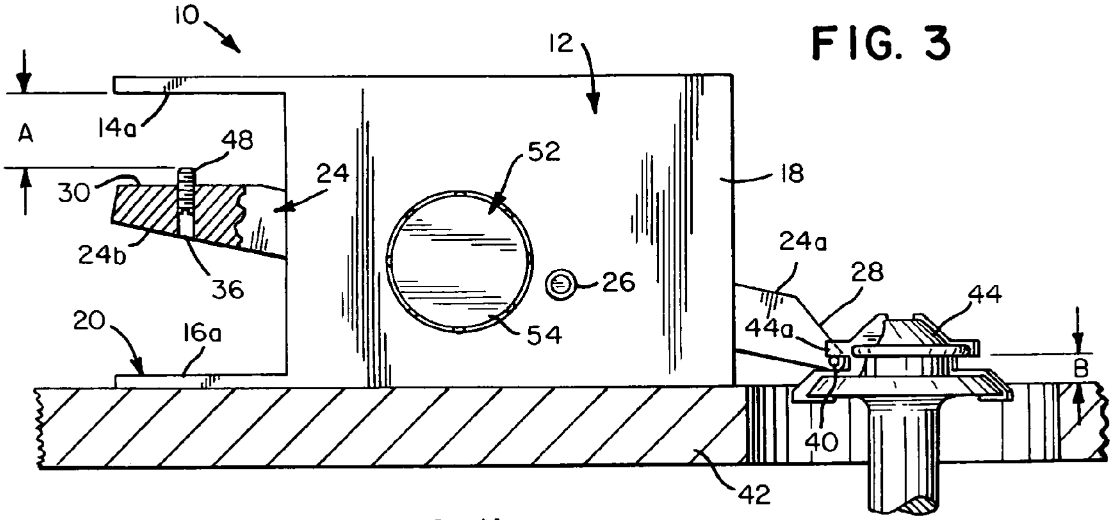
FIG. 3 is a right side view of the inverted lock miter gauge upon the top of a router table transferring a measurement to a 45° lock miter bit used with the router table.
Figure 4:
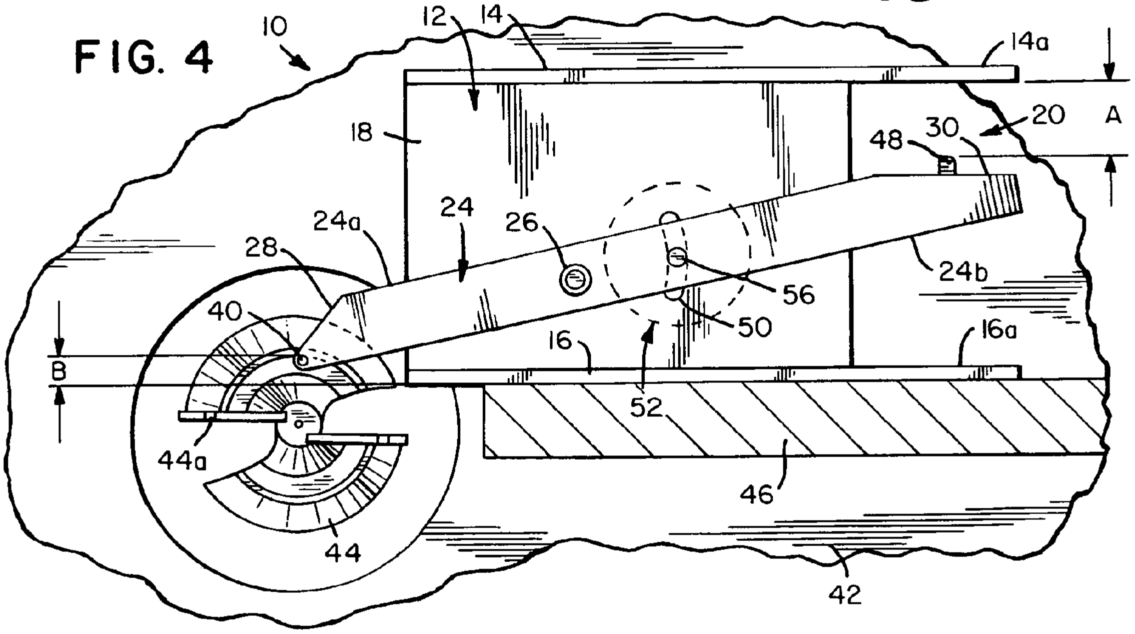
FIG. 4 is a left side view of the lock miter gauge engaging with the fence of a router table and transferring a measurement to a 45° lock miter bit used with the router table.
Figure 5:
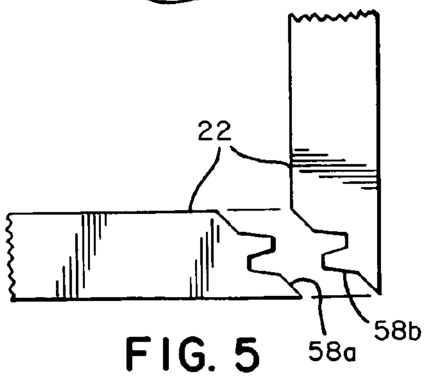
FIG. 5 is an exploded side view of a lock miter joint produced by a 45° lock miter router bit.
Figure 6:
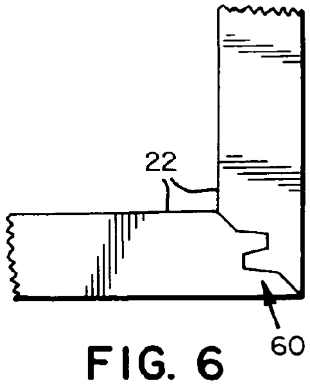
FIG. 6 is a side view of an assembled lock miter joint produced by a 45° lock miter router bit.

Referring now to the FIGS., a lock miter gauge in accordance with the present invention is shown at 10. Gauge 10 includes a base 12 having a C-shaped cross-sectional configuration with parallel top and bottom plates 14 and 16 joined along their right sides by a crosspiece 18. Plates 14 and 16 are of equal length and are somewhat longer than crosspiece 18 so as to form rearward projections **14*a* and 16*a* that extend rearwardly from crosspiece 18. The space bounded by crosspiece 18 and projections 14***a* and 16*a* defines a throat 20 into which one end of a board 22 can be inserted for measuring purposes.

A gauging arm 24 is pivotally connected to base 12. Arm 24 is positioned between top plate 14 and bottom plate 16 and is connected to crosspiece 18 by means of a pivot pin 26. Arm 24 has a front portion 24*a* that extends forwardly from pivot pin 26 beyond the front end of base 12. Arm 24 also has a rear portion 24*b* that extends rearwardly from pivot pin 26 and into throat 20. Front portion 24*a* of arm 24 is about one-half as long as rear portion 24*b* of arm 24.

Both front and rear portions 24*a* and 24*b* of arm 24 are tapered in terms of height. As shown, the top of front portion 24*a* is cut away at a 45° angle to provide front portion 24*a* with a sharply sloping top surface 28. Similarly, the top of rear portion 24*b* is cut away at a 10° angle to provide rear portion 24*b* with a gradually sloping top surface 30.

Arm 24 is penetrated by several bores 32, 34, 36 and 38. One bore 32 is provided for the passage of pivot pin 26. Another bore 34 passes horizontally through front portion 24*a* beneath surface 28. Still another bore 36 is internally threaded and extends at right angles to surface 30 through rear portion 24*b*. Finally, another internally threaded bore 38 passes horizontally through rear portion 24*b* between bores 32 and 36.

A gauging finger 40 extends laterally from front portion 24*a* of arm 24. Finger 40 is a rod of small diameter that is held by friction within bore 34. Gauging finger 40 is employed to transfer measurements derived from measuring board 22 to a router table 42, 45° lock miter bit 44, and fence 46.

A setscrew 48 is threadably engaged with bore 36 in rear portion 24*b* of arm 24. By selectively rotating setscrew 48, setscrew 48 can be caused to project from the top surface 30 toward rearward projection 14*a*. Thus, when the end of board 22 is grasped between rearward projection 14*a* and setscrew 48, the angular position of arm 24 relative to base 12 can be finely varied for calibrating and adjusting gauge 10.

An elongated slot 50 is provided in crosspiece 18 rearward of pivot pin 26. Slot 50 is located and configured so that it opens to threaded bore 38 in arm 24 throughout the range of motion of arm 24.

A thumbscrew 52 is employed to fix the angular orientation of arm 24 relative to base 12. Thumbscrew 52 includes a knob 54 positioned against the right side of crosspiece 18 and a threaded rod 56 that extends from knob 54 through slot 50 in crosspiece 18 and into bore 38 in arm 24. By selectively tightening thumbscrew 52, rod 56 draws arm 24 into snug engagement with crosspiece 18 so that gauge 10 can be moved about without arm 24 shifting position.

It must be noted that the positionings of the functional features of base 12 and arm 24 provide that the distance B, measured between the top of gauging finger 40 and the bottom of bottom plate 16, is one half of the distance A, measured between the top of setscrew 48 and the bottom of rearward projection 14*a*. Setscrew 48 offers variable positioning relative to rearward projection 14*a* so that a user of gauge 10 can adjust the ratio of distance A to distance B to compensate for manufacturing imperfections and variations in working conditions.

The use of gauge 10 is straightforward. First, one side of board 22 is grasped between setscrew 48 and rearward projection 14*a* and thumbscrew 52 is tightened to set the position of arm 24 relative to base 12. Then, bottom plate 16 is placed upon router table 42 adjacent a lock miter bit 44. Next, bit 44 is elevated so that finger 40 contacts the midpoint of notch-cutting blade protrusion 44*a* of bit 44. Now, bottom plate 16 is placed flush against the side of fence 46 and fence 46 is moved so that the top of finger 40 is aligned with the outside of protrusion 44*a*. (Note: the dimensions of protrusion 44*a* vary from manufacturer to manufacturer and minor adjustments of the position of fence 46 may be required in certain instances to achieve the proper cutting depth of bit 44.) When done, gauge 10 is removed and fence 46 is locked in place. Finally, a cut 58*a* is made in a board 22 positioned horizontally on router table 42 and a cut 58*b* is made in a counterpart board 22 positioned vertically against fence 46. The corresponding cuts 58*a* and 58*b* made by bit 44 in the horizontally and vertically oriented boards 22 will form a perfect 45° lock miter joint 60.

While lock miter gauge 10 has been described with a high degree of particularity, it will be appreciated by those skilled in the art that modifications can be made to it. Thus, it is to be understood that the scope of patent protection afforded by this document is not limited to the solely to gauge 10 described above, but encompasses any and all gauge embodiments within the scope of the following claims.

I claim:

1. A lock miter gauge, comprising:

a base being adapted for upright positioning upon a router table, said base including:

a bottom plate;

a top plate being positioned above said bottom plate; and, a crosspiece connecting said bottom plate to said top plate;

a gauging arm being pivotally connected to said crosspiece at a pivot point and having a front portion extending forwardly from said pivot point and a rear portion extending rearwardly from said pivot point;

a gauging finger extending laterally from said front portion of said gauging arm; and, a setscrew extending upwardly from said rear portion of said gauging arm to a location below said top plate.

2. The gauge according to claim 1 wherein said rear portion of said gauging arm is about twice as long as said front portion of said gauging arm.

3. The gauge according to claim 1 further comprising a thumbscrew being threadably engaged with said gauging arm for setting the position of said gauging arm relative to said base.

* * * * *